United States Patent
Addy (12)

(10) Patent No.: US 6,379,727 B1
(45) Date of Patent: Apr. 30, 2002

(54) FLAVORING SYSTEM FOR PET FOODS

(76) Inventor: John F. Addy, 214 E. Shore Dr., Hickory Corners, MI (US) 49060

( * ) Notice: Subject to any disclaimer, the term of this patent is extended or adjusted under 35 U.S.C. 154(b) by 0 days.

(21) Appl. No.: 09/474,222

(22) Filed: Dec. 29, 1999

(51) Int. Cl.[7] .......................... A23L 1/22; A23L 1/216; B65D 85/00
(52) U.S. Cl. .................. 426/96; 426/112; 426/115; 426/120; 426/635; 426/650; 426/805
(58) Field of Search .................... 426/120, 115, 426/112, 805, 658, 650, 289, 293, 96

(56) References Cited

U.S. PATENT DOCUMENTS

| | | | | |
|---|---|---|---|---|
| 4,267,195 A | * | 5/1981 | Boudreau et al. | 426/2 |
| 4,385,076 A | * | 5/1983 | Crosby | 426/533 |
| 4,713,250 A | * | 12/1987 | Tonyes et al. | 426/2 |
| 4,844,917 A | * | 7/1989 | DeLorimiere | 426/87 |
| 4,876,106 A | * | 10/1989 | Sabatura | 426/583 |
| 4,904,488 A | * | 2/1990 | LaBaw et al. | 426/107 |
| 4,913,919 A | * | 4/1990 | Cornwell et al. | 426/94 |
| 5,204,129 A | * | 4/1993 | Cherukuri et al. | 426/3 |
| 5,356,642 A | * | 10/1994 | Patterson et al. | 426/93 |
| 5,532,010 A | * | 7/1996 | Spanier et al. | 426/94 |
| 5,679,390 A | * | 10/1997 | Conover | 426/96 |
| 5,925,390 A | * | 7/1999 | Kornacki | 426/87 |
| 6,248,377 B1 | * | 6/2001 | Levine | 426/87 |

* cited by examiner

*Primary Examiner*—Nina Bhat
(74) *Attorney, Agent, or Firm*—Arthur S. Cookfair

(57) ABSTRACT

This invention relates to a variety flavoring system for pet food products comprising a multiplicity of individually packaged flavor additives, of different flavors, each suitable for convenient topical application to a base pet food product. The system provides the user with a choice of flavors to serve to a pet at an individual feeding and a convenient means to vary the flavor diet of the pet. Each individually packaged flavor additive comprises a mixture in powdered form, of maltodextrin, tricalcium phosphate, and an oleoresin flavorant. For the convenience of the user, each flavor may be separately packaged in a disposable shaker. Alternatively, the flavor additives may be dissolved, dispersed or composed within a liquid medium and provided in a suitable container for spraying onto the surface of the pet food.

8 Claims, No Drawings

FLAVORING SYSTEM FOR PET FOODS

BACKGROUND OF THE INVENTION

1. Field of the Invention

This invention relates to a system and compositions for providing pet food products having improved palatability and, in particular to a system for selectively providing varied flavor in a pet food diet.

2. Prior Art

Pet foods, particularly cat foods and dog foods, are commercially available in wet, dry, or semi-dry form, in various sizes and types of packaging. Food products designed for dogs, cats, or other household pets, are commonly made from meat, meat by-products, fish, fish by-products, cereals and grains and may also include vitamins and minerals. Typically such products are nutritious, but may not be highly savory or palatable.

Various methods and compositions are known for enhancing the palatability of pet foods by the addition flavorants or palatability enhancing compounds. U.S. Pat. No. 3,203,806 to Young discloses enhancing the palatability of pet foods by the addition of a flavor-enhancing additive containing a small amount of acetamide and acetic acid.

U.S. Pat. No. 4,070,490 to Lugay et al discloses a pet food having the flavor and texture of animal liver prepared by a process that comprises heating a mixture of water, emulsified fat, reducing sugar and blood.

U.S. Pat. No. 4,215,149 to Majlinger discloses a process for improving the palatability of particulate dry pet food by coating the surface of the particulates with fat and then applying a salt of phosphoric acid to the fat-coated surface.

U.S. Pat. No. 4,267,195 to Boudreau et al discloses the addition of certain palatability enhancing compounds to dog foods. The compounds applied include L-proline, L-cysteine, L-histidine, L-lysine, inosine 5'-triphosphate, inosine 5'-diphosphate, and adenosine 5'-triphosphate.

U.S. Pat. No. 4,393,085 to Sporadlin et al discloses a process for the preparation of dog food wherein the palatability of the product is improved by treating a farinaceous component of the food with both protease and amylase enzymes.

U.S. Pat. No. 5,186,964 to Gierhart et al discloses a method for increasing the palatability of dry cat food by the application of a surface coating of a sodium acid pyrophosphate, optionally together with an organic acid and a flavorant.

Although the prior art discloses various processes and compositions for enhancing the palatability of pet foods, it will be appreciated by those skilled in the art that a need continues to exist for improved methods and compositions for this purpose as well as a convenient and economical method for providing variety in the flavor and taste of pet foods.

SUMMARY OF THE INVENTION

It is an object of the present invention to provide pet foods of improved palatability.

It is a further object of the present invention to provide a process and composition that can be conveniently applied to a base pet food without the need for elaborate or complex processing equipment, to improve the palatability and flavor thereof.

It is a still further object to provide a system, suitable for home use, whereby a pet owner can conveniently and economically provide a flavor-varied diet for a household pet.

The above and other objects are accomplished in accordance with the present invention which comprises a flavoring system for pet food products based on a powdered or liquid flavor additive composition which may be topically applied to a dry or moistened pet food to enhance the palatability thereof and add flavor thereto.

Various powdered or granular flavor additive compositions may be employed in the flavoring system of the present invention and may be applied to a base pet food product, such as a dry pelletized dog food by sprinkling on the surface thereof, using, for example a seasoning shaker. In an alternate method, the dry powdered flavor additive composition may be dissolved or dispersed in a liquid medium, preferably an aqueous medium, and sprayed on a base pet food, for example with a hand sprayer, or added with mixing to a package of moist pet food. In another alternate method, a liquid flavor additive composition may be employed directly without prior dissolution and applied to the base pet food. The typical preparation of this liquid product is a base of broth or thinned gravy for meat based flavors or using water-emulsifier base system such as water-lecithin-vegetable oil for non-meat based flavor compositions. The base is 95–98% of the finished product. This base is placed into a mixing vat and receives the flavorings and a preservative/antioxidant such as vitamin E or lecithin. The solution is mixed until uniform and homogeneous. This liquid product has the advantage of being placed onto the food substrate more evenly than powder and allows water addition directly to the food substrate without premixing; however, it may be added directly to water for moistening as some consumers prefer for their pet's food.

In another aspect, the system of the present invention comprises a variety flavor pack, suitable for marketing, for example, in pet stores, or the pet food department of grocery stores, supermarkets, department stores and the like. The variety flavor pack of this invention includes a multiplicity of individually packaged flavor additives, providing the user with a choice of flavors to serve to a pet at an individual feeding and a convenient means of varying the flavor diet of the pet from one feeding to the next. Any number of packaged flavor additives may be included in variety flavor pack, preferably four to six packages, each of a different flavor. The packages may be of foil, plastic, paper, or other, and are preferably sealed to prevent loss of volatile components. The variety flavor pack may also include a large package of dry base pet food or a multiplicity of packages of base pet food, each, for example, containing an amount suitable for one or more meals, to which one of the selected flavors can be added. In a further preferred embodiment, for customer convenience, the variety flavor pack may also include a means for topical application of the flavoring composition, such as by dusting or shaking the powdered flavor additive on to the surface of the base pet food. Various topical application means may be employed. For example, a plastic or paper bag may be included whereby the user may place a selected amount of dry base pet food together with the contents of one of the flavor packs, close the bag, and shake it to disperse the flavor composition throughout the pet food. In another embodiment, the variety flavor pack may include a seasoning shaker or spray bottle with atomizer for convenience in topically applying the flavor additive to the base food. In still another embodiment, each of the individual flavor additives may be packaged in a separate disposable shaker or sprayer.

In a preferred embodiment, the flavor additive compositions comprise a mixture, in particulate form, of maltodextrin, an anti-caking agent, and a flavorant or flavorant mixture, such as oleoresin, pinacol, or any of the various flavorant compounds identified in the trade by a FEMA (Flavor Extract Manufacturers Association) number. A preferred anti-caking agent is tricalcium phosphate (TCP). The proportion of each component may vary considerably. A typical formulation, in parts by weight, is about 91 to about 99 parts maltodextrin, about 0.5 to about 4 parts of tricalcium phosphate and about 0.05 to about 5 parts of a flavorant.

Maltodextrin is a polysaccharide in composition somewhere between dextrin and maltose and is generally produced from the starch in barley during the manufacture of malt. Its exact composition varies somewhat depending on the relative amounts of maltose and dextrin.

The present invention and the manner in which it may be practiced are further illustrated by the following examples.

EXAMPLE 1

A flavor additive composition comprising, in parts by weight, 95 parts maltodextrin, 2 parts tricalcium phosphate, and 3 parts flavoring oleoresin containing flavor extract is prepared as follows:

Maltodextrin (95 parts) is placed in a rotary mixer. As the mixer rotates, approximately one third of the tricalcium phosphate (⅔ parts) is added followed by one third of the flavoring oleoresin (1 part). The additions are made slowly to allow thorough mixing. The addition of one third of the tricalcium phosphate and flavoring oleoresin is repeated twice. The mixture is packaged immediately to avoid loss of volatile high-note flavors.

EXAMPLE 2–7 the procedure of Example 1 is repeated varying the flavoring additive and proportions of ingredients in percent by weight within the ranges set forth in Table 1.

TABLE 1

| Example | Flavor | Flavorant Name or FEMA No. | Flavorant by weight | Maltodextrin by weight | TCP by weight |
| --- | --- | --- | --- | --- | --- |
| 2 | BBQ | Oleoresin | 1–3% | 91–95% | 2–4% |
| 3 | Pizza | (Pinacol) | 0.04–0.1% | | |
| | | 3588 | 0.1–04% | | |
| | | 2865 | 0.05–0.08% | | |
| | | 2843 | 0.2–0.8% | 96–98% | 1–3% |
| 4 | Beef Stew And Crackers | 2747 | 0.2–0.5% | | |
| | | 3244 | 0.3–0.6% | 97–99% | 0.5–2% |
| 5 | Sausage And Eggs | 2535 | 0.1–0.4% | | |
| | | 3523 | 0.3–0.6% | 97–99% | 0.5–2% |
| 6 | Peanut Butter and Jelly | 3281 | 0.3–0.5% | | |
| | | 2454 | 0.2–0.5% | | |
| | | 2489 | 0.2–0.6% | 96–98% | 1–3 |
| 7 | Roast Beef and Potatoes | 3272 | 0.3–0.6% | | |
| | | 3136 | 0.2–0.4% | 97–99% | 0.5–2% |

After mixing, the flavor formulations are divided into approximately one- to two-ounce portions and packaged in separate foil packs.

Following the general procedure of Examples 2–7, using various other flavorants or flavor extracts, a wide variety of other flavor formulations may be prepared and topically applied to a base pet food, such as that prepared in accordance with Example 8, below, or to various commercially available pet foods.

EXAMPLE 8

A base dog food was prepared by mixing ground corn (34%), ground oats (12%), soybean meal (25%), meat and bone meal (15%), corn gluten meal (10%), soybean oil (3%), salt (1.0%) and trace vitamins and minerals.

The mixture was moistened, extruded, cut to pellet size, and dried.

A meal-sized portion of the dried dog food was flavored by sprinkling a package of flavorant, prepared as in Examples 1–7, onto the surface.

The pet food variety flavor pack of this invention may include a package of pet food, such as a dog food or cat food, for example an unflavored pet food such as that prepared in accordance with Example 8.

Although the invention has been described with reference to certain embodiments thereof, it will be appreciated by those skilled in the art that modifications and variations may be made without departing from the spirit and scope of the invention as defined in the appended claims.

What is claimed is:

1. A flavoring system for pet foods comprising:
   a) a multiplicity of different powdered flavor additives, individually packaged;
   b) a package of unflavored dry dog food;
   c) an applicator for topically applying said powdered flavor additives to said unflavored dog food.

2. flavoring system according to claim 1 containing four to six different individually packaged powdered flavor additives.

3. A pet food variety flavor pack comprising a multiplicity of different dry flavorant compositions, each individually packaged in a separate shaker, suitable for topically applying to a base pet food by sprinkling thereon.

4. A pet food variety flavor pack according to claim 3 additionally comprising a package of base pet food.

5. A pet food variety flavor pack according to claim 3 additionally comprising a multiplicity of packages of base pet food, each of said packages containing an amount of said base pet food suitable for one or more pet meals.

6. A pet food variety flavor pack comprising a multiplicity of different liquid flavorant compositions, each of said liquid flavorant compositions being individually contained in a separate spray bottle suitable for topically applying to a base pet food by spraying thereon.

7. A pet food variety flavor pack according to claim 6 additionally comprising a package of base pet food.

8. A pet food variety flavor pack according to claim 6 additionally comprising a multiplicity of packages of base pet food, each of said packages containing an amount of said base pet food suitable for one or more pet meals.

* * * * *